United States Patent [19]
Conrad et al.

[11] Patent Number: 5,489,763
[45] Date of Patent: Feb. 6, 1996

[54] PRINTING AND ENCODING OF DOCUMENTS HAVING A MAGNETIC STRIP

[75] Inventors: Charles E. Conrad, Scottsville; Susan W. Baxter, Penn Yan, both of N.Y.

[73] Assignee: Xerox Corporation, Stamford, Conn.

[21] Appl. No.: 264,877

[22] Filed: Jun. 24, 1994

[51] Int. Cl.⁶ .............................. G06K 1/00; G06K 19/08
[52] U.S. Cl. ............................................ 235/384; 235/380
[58] Field of Search ................................... 235/384, 380, 235/375

[56] References Cited

U.S. PATENT DOCUMENTS

| | | | |
|---|---|---|---|
| 4,535,892 | 8/1985 | Roes et al. | 235/384 |
| 4,777,510 | 10/1988 | Russel | 355/7 |
| 4,827,425 | 5/1989 | Linden | 235/380 |
| 4,834,360 | 5/1989 | Acquaviva | 271/3.1 |
| 4,862,217 | 8/1989 | Russel | 355/218 |
| 5,207,412 | 5/1993 | Coons, Jr. et al. | 270/1.1 |
| 5,225,900 | 7/1993 | Wright | 358/75 |
| 5,281,799 | 1/1994 | McIntire et al. | 235/380 |

FOREIGN PATENT DOCUMENTS

| | | | |
|---|---|---|---|
| 19279 | 1/1985 | Japan | 235/380 |
| 96781 | 4/1989 | Japan | 235/380 |
| 9052 | 5/1992 | WIPO | 235/380 |

*Primary Examiner*—John Shepperd
*Attorney, Agent, or Firm*—Oliff & Berridge

[57] ABSTRACT

A system and method of printing a document and encoding information in a magnetic strip on the document wherein all the information to be printed and encoded is received from a single information source by the printer of the system. The document is printed with machine readable codes on a form having a magnetic strip. The printed codes are read by the system and used to magnetically encode information in the magnetic strip on the document. A system embodying the invention may also include a slitter for separating a printed and magnetically encoded document into sections, and a binder to bind plural documents or sections.

23 Claims, 3 Drawing Sheets

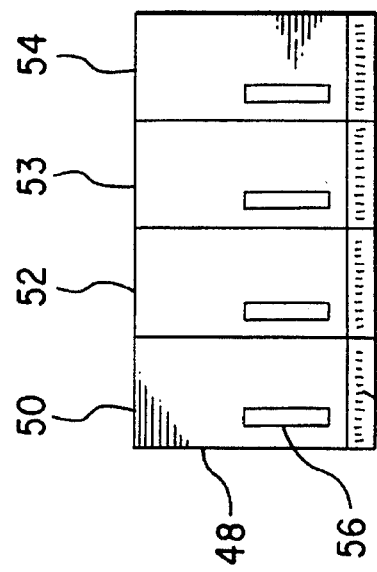
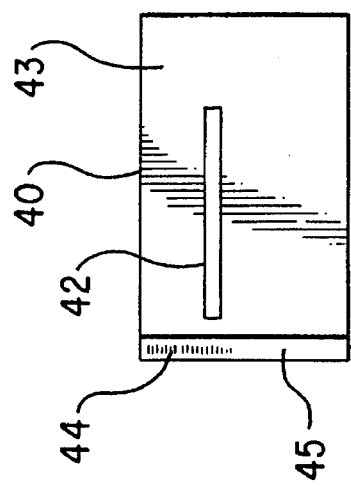
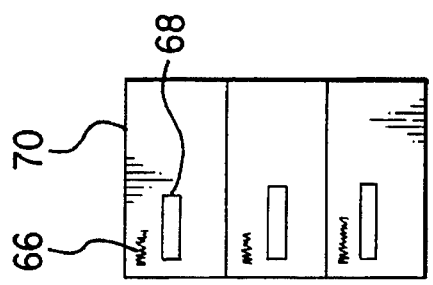
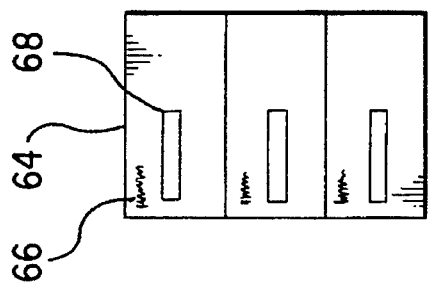
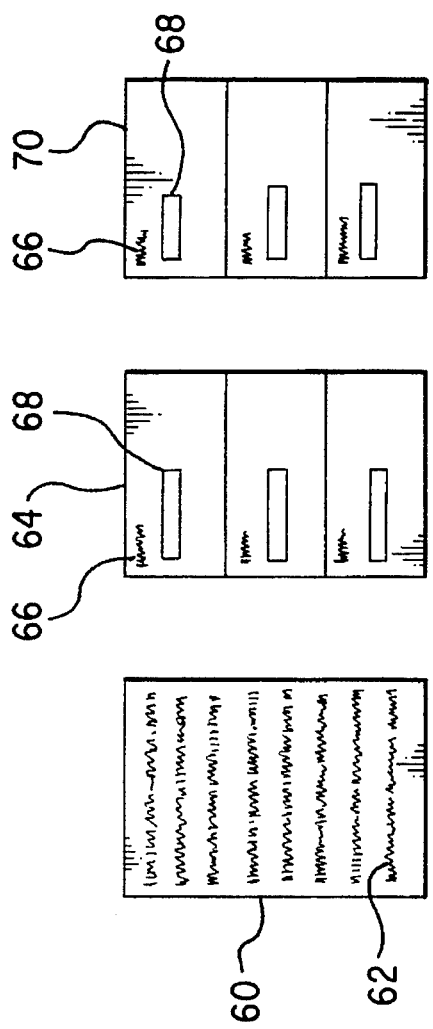

PRINTING AND ENCODING OF DOCUMENTS HAVING A MAGNETIC STRIP

BACKGROUND OF THE INVENTION

1. Field of the Invention

The invention is related to systems for printing documents having a magnetic strip and for encoding information in the magnetic strip.

2. Description of Related Art

Printed documents having a magnetically encoded strip are widely used as airline tickets and commercial checks. The information printed on the face of the document, and the information encoded in the magnetic strip of the document typically originate from a single information source and are related to one another.

SUMMARY OF THE INVENTION

The invention is a system and method of printing and magnetically encoding a document having a magnetic strip, wherein all document information from a single information source need only be provided to the printer of the system.

To create such a document it is necessary to provide the information to be printed on the face of the document to a printer, and the information to be magnetically encoded in the strip of the document to a magnetic encoding device. In order to verify that the magnetic encoding was successful, it may also be necessary to provide the same magnetically encoded information to a comparator where it is compared to information read from the magnetic strip after the encoding step. Thus, in order to carry out the printing and encoding steps the single information source must be connected to all three machines. In addition, because the machines may be physically separated from one another, with the documents passing from one machine to the next between steps, there must be some way to track the progress of a particular document to ensure the appropriate information is provided to the machines at the proper time.

It is an object of the invention to provide a simple system which can receive all information on a document from the single information source at one time, print the document, magnetically encode the information in the magnetic strip of the document, then check to ensure that the magnetic encoding process has occurred without error.

The system includes a printer that prints information on the face of the document in the form of human readable characters and machine readable bar codes. The bar code is encoded with all the information that must be encoded in the magnetic strip of the document. Once the document leaves the printer, all information is printed on the face of the document, and no further reference need be made to the single information source.

The system includes a bar code reader that reads the bar code printed on the document and transmits the bar code information to a document controller. The document controller translates the bar code information and transmits the translated information to a magnetic encoder that encodes the magnetic strip on the document. The system may also include a magnetic strip reader that reads the magnetically encoded information and transmits the information to the document controller. The document controller may then compare the magnetically encoded information to the bar code information to ensure the magnetic strip was properly encoded.

The system may also include a slitter for slitting a single sheet into plural sections, and a binder for binding plural documents or plural sections into a book.

BRIEF DESCRIPTION OF THE DRAWINGS

The invention will be described in detail with reference to the following figures wherein like elements bear like reference numerals and wherein:

FIG. 2 is a plan view of a document having a magnetic strip;

FIG. 3 is a plan view of a multipart document having plural magnetic strips;

FIGS. 4A, 4B and 4C show a set of documents comprising a complete print job of a system of the present invention.

DETAILED DESCRIPTION OF THE PREFERRED EMBODIMENTS

Figure 1:
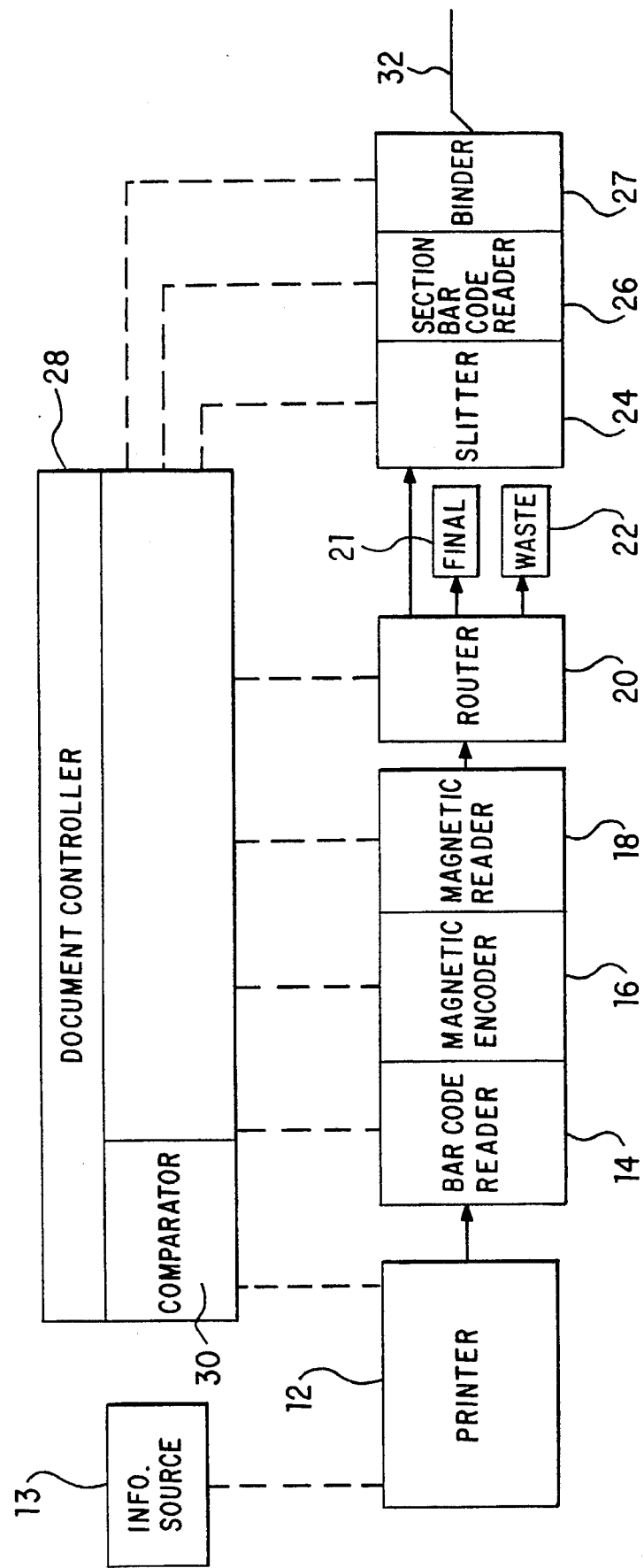
FIG. 1 is a block diagram of a system of the present invention.

A system of the present invention will be described with reference to the block diagram of FIG. 1.

A printer 12 receives all information for a particular document from a single information source 13. The printer prints the document on a sheet having a magnetic strip. The information printed on the face of the document includes a bar code or other encoding characters which contain the information that must be encoded in the magnetic strip. The document may be a single part or multi-part form.

FIG. 2 shows a single part form having a magnetic strip which may be used in the system of the present invention. The form 40 includes a magnetic strip 42 and may have a margin 46 separated from the body 43 of the form by a serrated portion 45 so that the margin 46 may be torn off the body 43 of the form. A bar code 44 may be printed in the tear-off margin 46. Alternately, the bar code may be printed directly on the body 43 of the form along with human readable characters.

The coded information may be in the form of a typical bar code, or may be provided in any machine readable code format. A coding format that appears to be a half-tone shaded section may be used. This allows the coding to be integrated with a shaded border or a shaded section of a picture.

FIG. 3 shows a multipart form which may also be used in the system of the present invention. The multipart form consists of separate sections 50, 52, 53 and 54. Each of the sections has its own magnetic strip 56 and bar code 58. As mentioned above, the bar codes may be printed on a tear-off margin of the document.

As shown in FIG. 1, once the document has been printed by the printer 12, it is forwarded to a bar code reader 14. The bar code reader 14 reads the bar code and transmits the bar code information to a document controller 28. The document is then forwarded to a magnetic encoder 16.

The document controller 28 interprets the bar code information and transmits information to the magnetic encoder 16 for encoding in the strip of the document. The magnetic encoder 16 encodes the magnetic strip with the information received from document controller 28. If the document has plural magnetic strips the magnetic encoder 16 may encode each of the magnetic strips individually, or plural magnetic encoding heads may be provided in the magnetic encoder 16 to simultaneously encode several magnetic strips on the document. After the magnetic strips are encoded, the document is forwarded to a magnetic strip reader 18.

The magnetic strip reader 18 reads the magnetically encoded information and transmits the information to the document controller 28. The document controller 28 compares the magnetically encoded information to the bar code information. The document controller 28 may include a comparator 30 to conduct the comparison. If the magnetically encoded information matches the bar code information, the document is forwarded to a router 20 for further processing.

If the magnetically encoded information does not match the bar code information, the document is sent back to the magnetic encoder 16 for re-encoding of the magnetic strip on the document. After the re-encoding step, the document is again forwarded to the magnetic reader 18. The magnetically re-encoded information is read by the magnetic reader 18 and transmitted to the document controller 28. The magnetically re-encoded information is compared to the bar code information. If the magnetically re-encoded information fails to match the bar code information after a predetermined number of re-encoding attempts, it is assumed that the magnetic strip has a physical defect.

If it is determined that a document has a physical defect, the document is routed to a waste manager 22 where it is destroyed. The document controller will then cause a new document to be printed and magnetically encoded to replace the destroyed document.

The router 20 receives a routing signal from the document controller 28. The routing signal instructs the router 20 to route the document to either the waste manager 22, a final delivery tray 21, or a slitter 24 and binder 27. If a magnetic strip of a document has a physical defect and cannot be magnetically encoded, the document is routed to the waste manager 22 for destruction. If the document is a single part document having a single magnetic strip, and the document is not to be bound with other documents, the document is routed to the final delivery tray 21.

If the document is a multipart form having plural magnetic strips, it may be routed to the slitter 24 where the document is separated into plural sections. If the sections are to form separate documents, the sections are delivered as the final product.

A section bar code reader 26 may be provided between the slitter 24 and the binder 27. The section bar code reader 26 may be used to read bar codes on a section after a document has been separated by the slitter 24 into sections. The bar code on a particular section may include information on which sections should be bound together as a book, and the appropriate page ordering for a book. The section bar code reader 26 transmits the section bar code information to the document controller 28.

Plural single part forms, or plural sections of multipart forms, may be bound together by the binder 27. The binder 27 is used to create a book of printed documents having magnetically encoded strips, for instance a book of airline coupons. The document controller 28 transmits a binding signal to the binder 27 which is based on the information read from the bar codes printed on the documents. The binding signal transmitted from the document controller 28 to the binder 27 instructs the binder 27 on which of the documents to bind into a book.

In an alternate embodiment, all of the information to be encoded in the magnetic strip of a document is not included in the bar code printed on the face of the document. This embodiment may be used where the amount of information to be magnetically encoded is quite large, and bar codes incorporating all the information would take up too much room on the face of the document.

In this embodiment, a first document is printed on a sheet not having a magnetic strip. The first document is printed with bar codes that include all the information to be magnetically encoded in one or more subsequently printed documents. The first document could have bar codes that incorporate all the information for a complete printing job, for instance a multipage airline coupon book.

After the first document is printed, subsequent documents are printed on sheets having magnetic strips. The subsequent documents may be single or multipart forms. A bar code is printed on each of the subsequent documents and is encoded with information that ties the subsequent document to the other documents of a complete printing job.

A set of documents comprising a complete printing job is shown in FIGS. 4A–4C. FIG. 4A shows a first document 60 not having a magnetic strip and printed with bar codes 62. FIGS. 4B and 4C show subsequent documents 64 and 70 which are multipart forms having plural magnetic strips 68 and plural bar codes 66. A complete printing job may include plural subsequent documents, each of the subsequent documents having plural sections with their own magnetic strip and bar code.

To print and encode a complete printing job in this embodiment of the invention, the first and subsequent documents are printed by the printer 12, then provided to the bar code reader 14 as shown in FIG. 1. The first document, with multiple bar codes, is read by the bar code reader 14 and the bar code information is transmitted to the document controller 28. Because the first document has no magnetic strips, and is merely intended to convey the information that must be encoded into the magnetic strips of subsequent documents, the first document is then routed to the waste manager 22.

A bar code on a subsequent document is read by the bar code reader 14 and the bar code information is transmitted to the document controller 28. The bar code information on the subsequent document identifies the subsequent document as a particular page of a complete printing job. The document controller 28 transmits information to the magnetic strip encoder 16 based on the first and subsequent document's bar codes, and the magnetic strip is encoded with information originally read from the first document. Each of the subsequent documents are encoded, or re-encoded as described above, then forwarded to the router 20.

Multipart forms are separated into sections in the slitter 24, and subsequent documents or sections of subsequent documents are bound by the binder 27.

Figure 5:
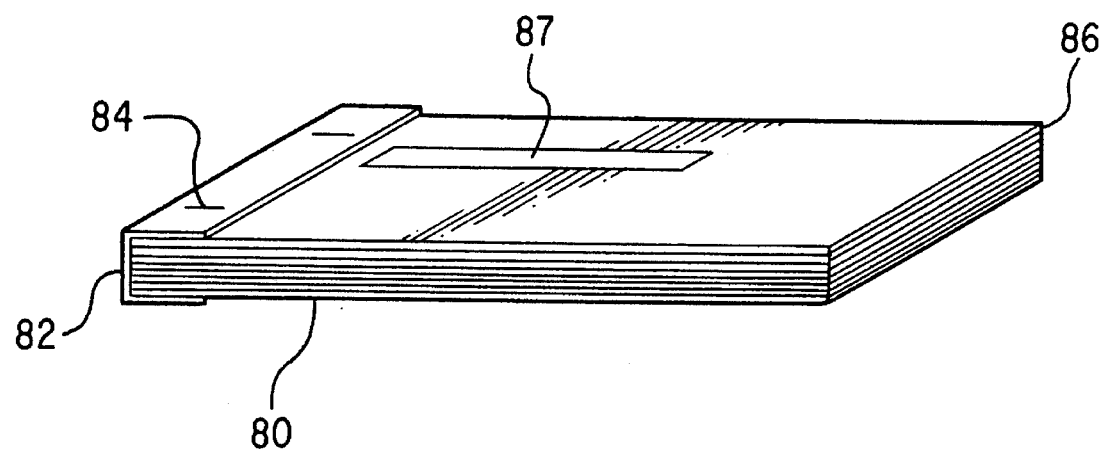
FIG. 5 shows a perspective view of a book of documents printed and magnetically encoded by a system of the present invention.

FIG. 5 shows a complete book of magnetically encoded and printed documents. The book 80 includes plural printed sheets 86, each having its own encoded magnetic strip 87. The book may be held together with staples 84 and may include a spine cover 82.

In the present invention, only the printer needs to be attached to the single information source. The system can print and encode documents without the need for each of the components of the system to be in communication with the single information source. In addition, the bar code information can be read after magnetic encoding to control the binding process to ensure a book is bound with all necessary pages, and in the correct order.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and scope of the appended claims.

What is claimed is:

1. A system for printing a document and encoding information on a magnetic strip on the document, comprising:

a printer for printing a document with a bar code on a sheet having a magnetic strip;

a bar code reader for receiving the printed document and for reading the information encoded in the bar code;

a document controller connected to the printer and bar code reader for translating the bar code information read from the bar code;

a magnetic strip encoder connected to the document controller for receiving the printed document and magnetically encoding information in the magnetic strip of the document based on the translated bar code information; and a binder connected to the document controller for receiving plural magnetically encoded documents and for binding the plural documents into a book based on a binding signal transmitted from the document controller to the binder.

2. The system of claim 1, further comprising:

a magnetic strip reader connected to the document controller for receiving a magnetically encoded document, reading the magnetically encoded information, and transmitting the magnetically encoded information to the document controller; and a document router connected to the document controller for receiving a document from the magnetic strip reader and for routing the document based on a routing signal received from the document controller;

wherein the document controller compares the magnetically encoded information to the translated bar code information and causes the magnetically encoded document to be routed to one of the magnetic strip encoder for re-encoding of the magnetic strip and the router based on the results of the comparison.

3. The system of claim 2, wherein the routing signal is based on the results of the comparison between the magnetically encoded information and the translated bar code information.

4. The system of claim 3, wherein the document router routes the document to one of a final delivery bin and a waste manager.

5. A system for printing a document and encoding information on a magnetic strip on the document, comprising:

a printer for printing a document with a bar code on a sheet having a magnetic strip;

a bar code reader for receiving the printed document and for reading the information encoded in the bar code;

a document controller connected to the printer and bar code reader for translating the bar code information read from the bar code;

a magnetic strip encoder connected to the document controller for receiving the printed document and magnetically encoding information in the magnetic strip of the document based on the translated bar code information; and a slitter connected to the document controller for receiving a magnetically encoded document and for selectively separating the document into plural sections based on a slitting signal transmitted from the document controller to the slitter.

6. The system of claim 5, further comprising:

a binder connected to the document controller for receiving plural sections and for binding the sections into a book based on a binding signal transmitted from the document controller to the binder.

7. The system of claim 6, wherein the router routes the document to one of a final delivery bin, the slitter, the binder, and a waste manager, based on at least one of the bar code information, the results of the comparison of the magnetically encoded information to the translated bar code information, and the number of times a magnetic strip of the document has been re-encoded.

8. The system of claim 6, further comprising:

a section bar code reader connected to the document controller for receiving a section from the slitter and for reading a section bar code printed on the section and transmitting the section bar code information to the document controller.

9. The system of claim 8, wherein the binding signal is based on the section bar code information.

10. A system for printing a document and encoding information in a magnetic strip on the document, comprising:

a printer for printing a first document with a bar code on a sheet without a magnetic strip and at least one subsequent document with a bar code on a sheet having a magnetic strip;

a bar code reader for receiving the first and at least one subsequent documents and reading the information encoded in the bar codes;

a document controller connected to the printer and bar code reader for translating the bar code information read from the bar codes; and a magnetic strip encoder connected to the document controller for encoding information in the magnetic strip of the at least one subsequent document based on the translated bar code information.

11. The system of claim 10, further comprising:

a magnetic strip reader connected to the document controller for reading the magnetically encoded information and transmitting the magnetically encoded information to the document controller; and a document router, connected to the document controller for routing the first and at least one subsequent documents based on a routing signal transmitted from the document controller to the router;

wherein the document controller compares the magnetically encoded information to the bar code information read from the first and at least one subsequent documents and causes the at least one subsequent document to be routed to one of the magnetic strip encoder for re-encoding of the magnetic strip, and the document router based on the comparison.

12. The system of claim 11, further comprising:

a slitter for receiving the at least one subsequent document and for slitting the at least one subsequent document into plural sections; and a binder, connected to the document controller, for receiving plural sections and for binding the sections into a book based on a binding signal transmitted from the document controller to the binder.

13. A method of printing a document and encoding information on a magnetic strip on the document, comprising the steps of:

printing a document with a bar code on a sheet having a magnetic strip;

reading the bar code information and transmitting the bar code information to a document controller;

encoding information in the magnetic strip of the document based on the bar code information; and binding plural documents into a document book.

14. The method of claim 13, further comprising the steps of:

reading the magnetically encoded information from the magnetic strip of the document and transmitting the magnetically encoded information to the document controller;

comparing the magnetically encoded information to the bar code information; and selectively re-encoding information in the magnetic strip of the document based on the results of the comparison.

15. The method of claim 14, further comprising the step of:

routing the document based on the results of the comparison.

16. The method of claim 15, further comprising the steps of:

routing the document to a waste manager when the document has been re-encoded a predetermined number of times and the magnetically encoded information still does not match the bar code information; and routing the document to a final delivery tray when the magnetically encoded information matches the bar code information.

17. A method of printing a document and encoding information on a magnetic strip on the document, comprising the steps of:

printing a document with a bar code on a sheet having a magnetic strip;

reading the bar code information and transmitting the bar code information to a document controller;

encoding information in the magnetic strip of the document based on the bar code information;

slitting the document into plural sections; and binding the plural sections into a book with a binder based on a binding signal transmitted from the document controller to the binder.

18. The method of claim 17, further comprising the step of:

reading a bar code of a section after a document has been separated into sections and transmitting the section bar code information to the document controller;

wherein the binding signal is based on the section bar code information.

19. A method of printing a document and encoding information in a magnetic strip on the document, comprising the steps of:

printing a first document with bar codes encoded with information on a printing job on a sheet without a magnetic strip;

printing a subsequent document with a bar code on a sheet having a magnetic strip;

reading the bar code information on the first and subsequent documents and transmitting the information to a document controller; and encoding information in the magnetic strip of the subsequent document based on the bar code information read from the first document.

20. The method of claim 19, further comprising the steps of:

reading the magnetically encoded information and transmitting the magnetically encoded information to the document controller;

comparing the magnetically encoded information to the bar code information read from the first and subsequent documents; and re-encoding information in the magnetic strip of the subsequent document when the magnetically encoded information does not match the bar code information.

21. The method of claim 20, further comprising the step of:

binding plural subsequent documents into a book with a binder based on a binding signal transmitted from the document controller to the binder.

22. The method of claim 20, further comprising the steps of:

slitting the subsequent document into plural sections; and binding plural sections into a book with a binder based on a binding signal transmitted from the document controller to the binder.

23. The method of claim 22, further comprising the step of:

reading a bar code on a section and transmitting the section bar code information to the document controller;

wherein the binding signal is based on the section bar code information.

* * * * *